United States Patent
Bandholz et al.

(10) Patent No.: US 8,630,207 B2
(45) Date of Patent: *Jan. 14, 2014

(54) OPTIMIZING A PHYSICAL DATA COMMUNICATIONS TOPOLOGY BETWEEN A PLURALITY OF COMPUTING NODES

(75) Inventors: Justin P. Bandholz, Cary, NC (US); Zachary B. Durham, Durham, NC (US); Clifton E. Kerr, Durham, NC (US); Joseph E. Maxwell, Cary, NC (US); Kevin M. Reinberg, Chapel Hill, NC (US); Kevin S. Vernon, Durham, NC (US); Philip L Weinstein, Apex, NC (US); Christopher C. West, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,309

(22) Filed: May 1, 2012

(65) Prior Publication Data

US 2012/0213066 A1 Aug. 23, 2012

Related U.S. Application Data

(63) Continuation of application No. 12/040,316, filed on Feb. 29, 2008, now Pat. No. 8,213,334.

(51) Int. Cl.
*H04L 12/28* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*G06F 15/173* (2006.01)
*H04L 12/24* (2006.01)

(52) U.S. Cl.
CPC ............ *H04L 41/0823* (2013.01); *H04L 41/08* (2013.01)

USPC ........... 370/254; 370/229; 370/235; 709/238; 709/240; 709/241; 709/242

(58) Field of Classification Search
CPC ............................ H04L 41/08; H04L 41/0823
USPC ........... 370/229, 235, 254; 709/240, 241, 242
See application file for complete search history.

(56) References Cited

U.S. PATENT DOCUMENTS 4,556,972 A 12/1985 Chan et al.
4,703,475 A 10/1987 Dretzka et al.

(Continued)

OTHER PUBLICATIONS

Mitchell; "Dynamically Assignable Processor-To-Processor Communication Links"; IBM Technical Disclosure Bulletin; Nov. 1981; pp. 3004-3005; vol. 24, No. 6, IBM Corporation; USA.

(Continued)

*Primary Examiner* — Ayaz Sheikh
*Assistant Examiner* — Tarell Hampton
(74) *Attorney, Agent, or Firm* — H. Barrett Spraggins; Katherine S. Brown; Biggers Kennedy Lenart Spraggins LLP

(57) ABSTRACT

Methods, apparatus, and products are disclosed for optimizing a physical data communications topology between a plurality of computing nodes, the physical data communications topology including physical links configured to connect the plurality of nodes for data communications, that include carrying out repeatedly at a predetermined pace: detecting network packets transmitted through the links between each pair of nodes in the physical data communications topology, each network packet characterized by one or more packet attributes; assigning, to each network packet, a packet weight in dependence upon the packet attributes for that network packet; determining, for each pair of nodes in the physical data communications topology, a node pair traffic weight in dependence upon the packet weights assigned to the network packets transferred between that pair of nodes; and reconfiguring the physical links between each pair of nodes in dependence upon the node pair traffic weights.

15 Claims, 7 Drawing Sheets

(56) References Cited

U.S. PATENT DOCUMENTS

| | | | |
|---|---|---|---|
| 5,218,676 | A | 6/1993 | Ben-Ayed et al. |
| 5,471,467 | A | 11/1995 | Johann |
| 5,557,748 | A | 9/1996 | Norris |
| 6,260,120 | B1 | 7/2001 | Blumenau et al. |
| 6,671,819 | B1 | 12/2003 | Passman et al. |
| 6,721,899 | B1 | 4/2004 | Narvaez-Guarnieri et al. |
| 7,002,927 | B2 | 2/2006 | Guruprasad |
| 7,110,389 | B2 | 9/2006 | Ramanan et al. |
| 7,254,142 | B2 | 8/2007 | Hagsand et al. |
| 8,213,334 | B2 | 7/2012 | Bandholz et al. |
| 2002/0154601 | A1 | 10/2002 | Kawasaki et al. |
| 2003/0186702 | A1 | 10/2003 | McConnell et al. |
| 2003/0231599 | A1 | 12/2003 | Umezawa |
| 2004/0095946 | A1 | 5/2004 | Baker |
| 2006/0259542 | A1 | 11/2006 | Wu et al. |
| 2007/0147254 | A1 | 6/2007 | Larsson et al. |
| 2008/0013502 | A1 | 1/2008 | Clark |
| 2008/0261602 | A1 | 10/2008 | Livneh |

OTHER PUBLICATIONS

"Traffic Redirection Technique in Multi-Speed Network Design"; IBM Technical Disclosure Bulletin; Nov. 1991; pp. 371-374; vol. 34, No. 6; IBM Corporation, USA.

"Load Balancing for Variable Sized Connections With Dynamically Changing Bandwidth Requirements"; IBM Technical Disclosure Bulletin; Oct. 1992; pp. 435-438; vol. 35, No. 5; IBM Corporation, USA.

Picker, et al.; "An Extension to the SCI Flow Control Protocol for Increased Network Efficiency"; IEEE/ACM Transactions on Networking; Feb. 1996; pp. 71-85; vol. 4, No. 1; IEEE Computer Society Press, Los Alamitos, CA.

"zSeries Availability and Workload Balancing Tutorial"; IBM Corporation (online) 2005; pp. 1-38, [accessed Aug. 24, 2012]; URL: http://publib.boulder.ibm.com/infocenter/ieduasst/stgv1r0/topic/com.ibm.iea.commserv_v1/commserv/1.6z/loadbal/Availability_and_Workload_Balancing_tutorial.pdf?dmuid=20061231220804353712.

Office Action, U.S. Appl. No. 12/040,316, filed Sep. 24, 2009, pp. 1-19.

Office Action, U.S. Appl. No. 12/040,316, filed Mar. 2, 2010, pp. 1-16.

Office Action, U.S. Appl. No. 12/040,316, filed Jul. 21, 2010, pp. 1-11.

Final Office Action, U.S. Appl. No. 12/040,316, filed Jan. 5, 2011, pp. 1-7.

Office Action, U.S. Appl. No. 12/040,316, filed May 3, 2011, pp. 1-6.

Final Office Action, U.S. Appl. No. 12/040,316, filed Sep. 6, 2011, pp. 1-6.

Notice of Allowance, U.S. Appl. No. 12/040,316, filed Feb. 23, 2012, pp. 1-10.

OPTIMIZING A PHYSICAL DATA COMMUNICATIONS TOPOLOGY BETWEEN A PLURALITY OF COMPUTING NODES

CROSS-REFERENCE TO RELATED APPLICATION

This application is a continuation application of and claims priority from U.S. patent application Ser. No. 12/040,316, filed on Feb. 29, 2008.

BACKGROUND OF THE INVENTION

1. Field of the Invention

The field of the invention is data processing, or, more specifically, methods, apparatus, and products for optimizing a physical data communications topology between a plurality of computing nodes.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computing systems today that are much more powerful than just a few years ago.

One of the areas in which substantial technical advances have been achieved is in connecting multiple computing nodes together for data communications. The nodes are typically connected to one another through one or more physical links configured according to a particular physical data communications topology. Each physical link is a physical data communication channel between two nodes and is often implemented using traces on a printed circuit boards, cables, and switches in a network switch. The data communications topology used to connect the various nodes is usually balances. That is, each pair of nodes directly connected through links is typically connected using approximately the same number of links The drawback to such topologies, however, is that often the network traffic between one pair of nodes is heavier than the network traffic between the other pairs of nodes. As such, some links in the topology are congested with network traffic, while other links may be underutilized, thereby increasing overall network latency and reducing network performance.

SUMMARY OF THE INVENTION

Methods, apparatus, and products are disclosed for optimizing a physical data communications topology between a plurality of computing nodes, the physical data communications topology including physical links configured to connect the plurality of nodes for data communications, that include carrying out repeatedly at a predetermined pace: detecting network packets transmitted through the links between each pair of nodes in the physical data communications topology, each network packet characterized by one or more packet attributes; assigning, to each network packet, a packet weight in dependence upon the packet attributes for that network packet; determining, for each pair of nodes in the physical data communications topology, a node pair traffic weight in dependence upon the packet weights assigned to the network packets transferred between that pair of nodes; and reconfiguring the physical links between each pair of nodes in dependence upon the node pair traffic weights.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
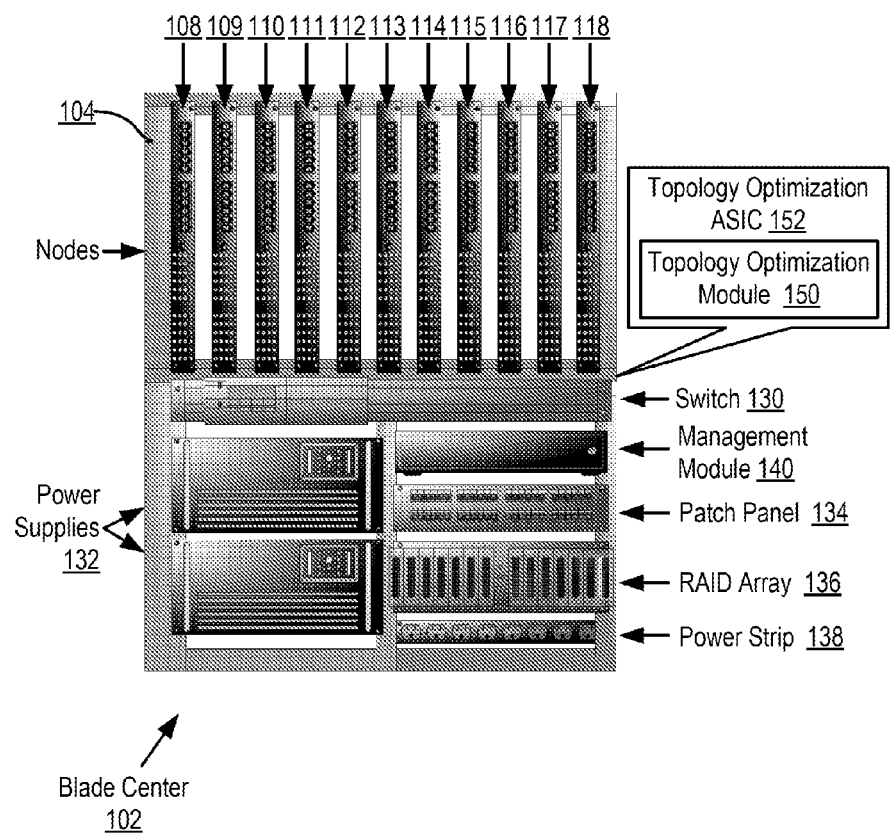
FIG. 1 sets forth a front view of an exemplary blade center that is configured for optimizing a physical data communications topology between a plurality of computing nodes according to embodiments of the present invention.

Exemplary methods, systems, and products for optimizing a physical data communications topology between a plurality of computing nodes according to embodiments of the present invention are described with reference to the accompanying drawings, beginning with FIG. 1. FIG. 1 sets forth a front view of an exemplary blade center (102) that is configured for optimizing a physical data communications topology between a plurality of computing nodes according to embodiments of the present invention. The system of FIG. 1 includes eleven computing nodes (108-118) implemented as blade servers installed in a cabinet bay (104) of a blade center (102). Each computing node (108-118) of FIG. 1 is self-contained computer server designed for high density computing. Whereas standard rack-mounted servers exist with a power supply, video adapters, and certain input/output adapters, blade servers have many such components removed for space, power, and other considerations. The blade center (102) provides the functionality for the removed components to the individual blade servers.

The computing nodes (108-118) of FIG. 1 are connected for data communications through a network switch (130). Each node (108-118) connects to the switch (130) through a switch port, and the switch (130) of FIG. 1 operates to connect nodes together by configuring one or more physical links between each node and at least one other node. In such a manner, the switch (130) of FIG. 1 controls the physical data communication topology between the plurality of nodes (108-118).

The exemplary blade center (102) of FIG. 1 includes a topology optimization application-specific integrated circuit ('ASIC') (152). The topology optimization ASIC (152) of FIG. 1 has installed upon it a topology optimization module (150), a set of computer program instructions for optimizing a physical data communications topology between a plurality of computing nodes according to embodiments of the present invention. The topology optimization module (150) may operate generally for optimizing a physical data communications topology between a plurality of computing nodes according to embodiments of the present invention by repeatedly at a predetermined pace: detecting network packets transmitted through the links between each pair of nodes (108-118) in the physical data communications topology, each network packets characterized by one or more packet attributes; assigning, to each network packet, a packet weight in dependence upon the packet attributes for that network packet; determining, for each pair of nodes (108-118) in the physical data communications topology, a node pair traffic weight in dependence upon the packet weights assigned to the network packets transferred between that pair of nodes; and reconfiguring the physical links between each pair of nodes (108-118) in dependence upon the node pair traffic weights. The topology optimization module (150) may also operate generally for optimizing a physical data communications topology between a plurality of computing nodes according to embodiments of the present invention by: tracking physical link reconfiguration changes over a predetermined time period and determining the predetermined pace in dependence upon tracked reconfiguration changes.

The exemplary blade center (102) of FIG. 1 includes a blade management module (104). The blade management module (140) of FIG. 1 is a hot-swappable device that can be used by a system administrator to configure and manage all components installed in the blade center (102). In addition to the blade management module (140), the blade center (102) also includes power supplies (132) that provides power to all components of the blade center (102), a patch panel (134), a Redundant Array of Independent Disks (RAID') (136), and a power strip (138). In the system of FIG. 1, the power supply (132) and the blade management module (140) are housed in cabinet bays for purposes of clarity. Those of skill in the art will recognize, however, that the power supply and blade management module (140) may be embedded as part of the blade center (102) or be implemented in a system external to the blade center (102).

The arrangement of computing nodes, power supply, RAID array, power strip, and other devices making up the exemplary blade center illustrated in FIG. 1 are for explanation, not for limitation. Blade centers useful according to various embodiments of the present invention may include additional servers, routers, or other devices, not shown in FIG. 1, as will occur to those of skill in the art. Moreover, readers will note that other computer architectures besides blade server architectures may also be useful in optimizing a physical data communications topology between a plurality of computing nodes in accordance with the present invention such as, for example, computing nodes connected through local area networks ('LANs'). In fact, various embodiments of the present invention may be implemented on a variety of hardware platforms in addition to those illustrated in FIG. 1.

Optimizing a physical data communications topology between a plurality of computing nodes in accordance with the present invention is generally implemented with computers, that is, with automated computing machinery. In the system of FIG. 1, for example, all the blade servers, the management module, the topology optimization ASIC, and the communications devices are implemented to some extent at least as computers. For further explanation, therefore, FIG. 2 sets forth a block diagram of automated computing machinery comprising an exemplary topology optimization ASIC (152) useful in optimizing a physical data communications topology (200) between a plurality of computing nodes (220-225) according to embodiments of the present invention. The topology optimization ASIC (152) of FIG. 2 includes at least one computer processor (156) or 'CPU' as well as random access memory (168) ('RAM') which is connected through a high speed memory bus (166) and bus adapter (158) to the processor (156) and to other components of the computer.

Figure 2:
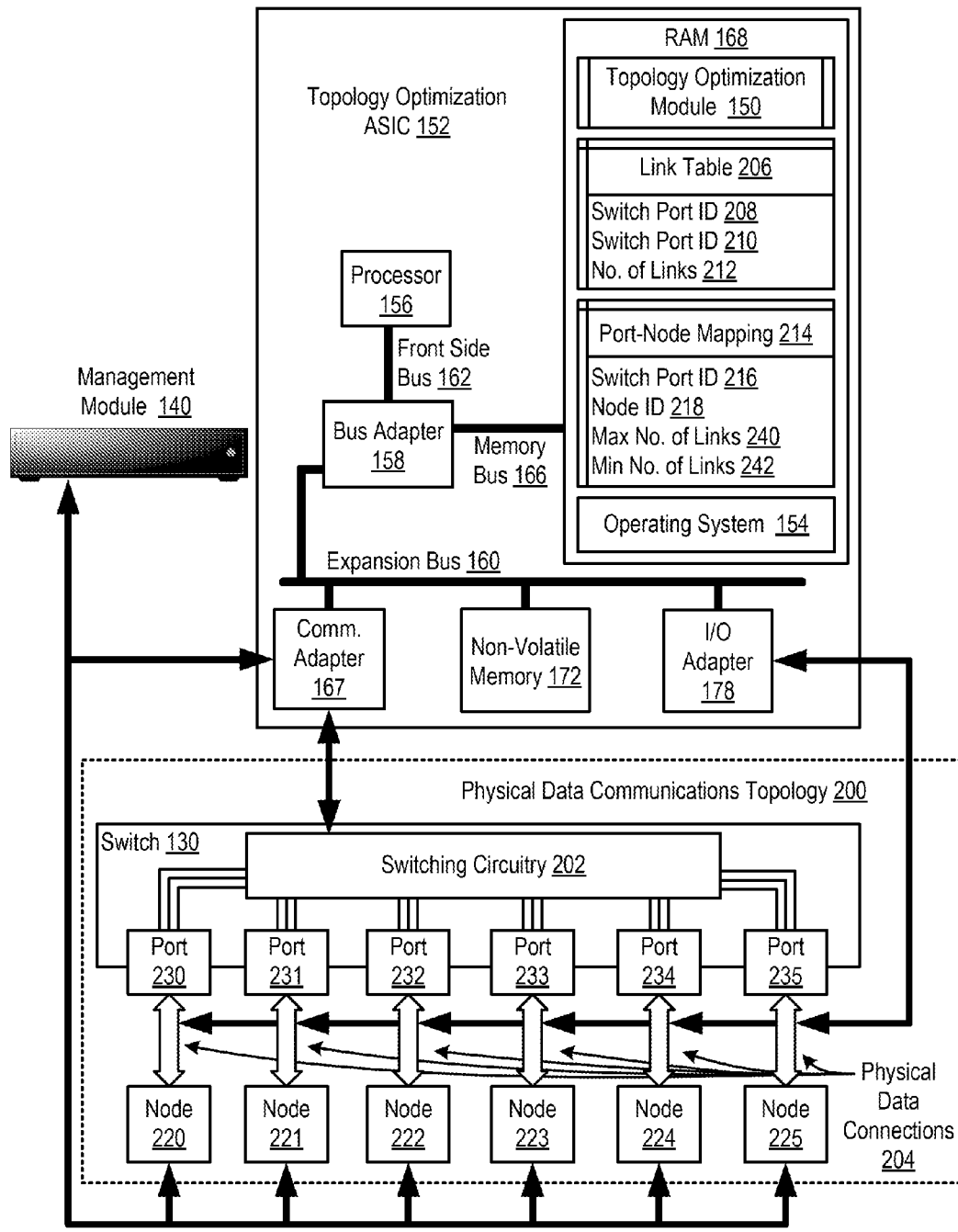
FIG. 2 sets forth a block diagram of automated computing machinery comprising an exemplary topology optimization application-specific integrated circuit ('ASIC') useful in optimizing a physical data communications topology between a plurality of computing nodes according to embodiments of the present invention.

Stored in RAM (168) is a topology optimization module (150). The topology optimization module (150) of FIG. 2 is a set of computer program instructions for optimizing a physical data communications topology (200) between a plurality of computing nodes (220-225) according embodiments of the present invention. The topology optimization module (150) operates generally for optimizing a physical data communications topology (200) between a plurality of computing nodes (220-225) according embodiments of the present invention by repeatedly at a predetermined pace: detecting network packets transmitted through the links between each pair of nodes (220-225) in the physical data communications topology (200), each network packets characterized by one or more packet attributes; assigning, to each network packet, a packet weight in dependence upon the packet attributes for that network packet; determining, for each pair of nodes (220-225) in the physical data communications topology (200), a node pair traffic weight in dependence upon the packet weights assigned to the network packets transferred between that pair of nodes (220-225); and reconfiguring the physical links between each pair of nodes (220-225) in dependence upon the node pair traffic weights.

The physical data communications topology (200) of FIG. 2 includes physical links configured to connect the plurality of nodes (220-225) for data communications. As mentioned above, each physical link is a physical data communication channel between two nodes. Each physical link is implemented in FIG. 2 using the pair of physical data connections (204) between the pair of nodes (220-225) and their respective switch ports (230-235) on the switch (130) and connections between the those respective switch ports (230-235) through switching circuitry (202) of the network switch (130). For example, consider that the physical data communications topology (200) of FIG. 2 includes one or more links between node (220) and node (222). In such an example, the links between node (220) and node (222) may be implemented using the pair of physical data connections (204) between nodes (220, 222) and switch ports (230, 232), respectively, and through switching circuitry (202) that connects switch port (230) and switch port (232).

The topology optimization module (150) configures the physical links between each pair of nodes (220-225) by altering the physical connections between the switch ports (230-235) through the switching circuitry (202) of the switch (130). The topology optimization module (150) may configure the switching circuitry (202) using any number of data communications protocols as will occur to those of skill in the art such as, for example, Inter-Integrated Circuit ('I²C') bus protocol, a System Management Bus ('SMBus') protocol, an Intelligent Platform Management Bus ('IPMB') protocol, or the like.

The topology optimization module (150) maintains information regarding the state of physical data communication topology (200) using a switch port-node mapping (214) and a link table (206). The switch port-node mapping (214) specifies the switch port (230-235) to which each node (220-225) is connected. Each record of the switch port-node mapping (214) includes a switch port identifier field (216) that specifies a particular switch port and a node identifier field (218) that specifies the node connected to the associated switch port. Each record also includes a maximum number of links field (240) that specifies the maximum number of links supported by the associated switch port and node. Each record also includes a minimum number of links field (242) that specifies the minimum number of links that are required by the associated switch port and node. For example, consider the following exemplary switch port-node mapping:

TABLE 1

EXEMPLARY SWITCH PORT-NODE MAPPING

| SWITCH PORT IDENTIFIER FIELD | NODE IDENTIFIER FIELD | MAX. NO. OF LINKS | MIN. NO. OF LINKS |
|---|---|---|---|
| SwithPort_230 | Node_230 | 8 | 1 |
| SwitchPort_231 | Node_231 | 8 | 1 |
| SwitchPort_232 | Node_232 | 8 | 1 |
| SwitchPort_233 | Node_233 | 8 | 1 |
| SwitchPort_234 | Node_234 | 8 | 1 |
| SwitchPort_235 | Node_235 | 8 | 1 |

The exemplary switch port-node mapping above describes the relationships between the switch ports (230-235) and the nodes (220-225) illustrated in FIG. 2. The exemplary switch port-node mapping above specifies that node (220) connects to switch port (230) of the switch (130) through the physical data connections (204). The exemplary switch port-node mapping above specifies that node (221) connects to switch port (231) of the switch (130) through the physical data connections (204). The exemplary switch port-node mapping above specifies that node (222) connects to switch port (232) of the switch (130) through the physical data connections (204). The exemplary switch port-node mapping above specifies that node (223) connects to switch port (233) of the switch (130) through the physical data connections (204). The exemplary switch port-node mapping above specifies that node (224) connects to switch port (234) of the switch (130) through the physical data connections (204). The exemplary switch port-node mapping above specifies that node (225) connects to switch port (235) of the switch (130) through the physical data connections (204). The exemplary switch port-node mapping above specifies each switch port (230-235) supports a maximum of eight links and requires a minimum of one link. Readers will note that the exemplary switch port-node mapping illustrated in FIG. 2 and described above is for explanation only and not for limitation.

In the example of FIG. 2, the link table (206) describes the links between pairs of switch ports (230-235) connected through the switching circuitry (202) of the switch (130).

Each record of the link table (206) includes two switch port identifier fields (208, 210) that specify the switch ports (230-235) through which the links are formed. Each record also includes a number of links field (212) that specifies the number of links configured between the associated switch ports. For example, consider the following exemplary link table:

TABLE 2

EXEMPLARY LINK TABLE

| SWITCH PORT IDENTIFIER | SWITCH PORT IDENTIFIER | NO. OF LINKS |
|---|---|---|
| SwitchPort_230 | SwitchPort_231 | 1 |
| SwitchPort_230 | SwitchPort_232 | 0 |
| SwitchPort_230 | SwitchPort_233 | 1 |
| SwitchPort_230 | SwitchPort_234 | 2 |
| SwitchPort_230 | SwitchPort_235 | 4 |
| SwitchPort_231 | SwitchPort_232 | 1 |
| SwitchPort_231 | SwitchPort_233 | 1 |
| ... | ... | ... |

The exemplary link table above specifies that one link is configured between switch port (230) and switch port (231), no links are configured between switch port (230) and switch port (232), one link is configured between switch port (230) and switch port (233), two links are configured between switch port (230) and switch port (234), four links are configured between switch port (230) and switch port (235), one link is configured between switch port (231) and switch port (232), and one link is configured between switch port (231) and switch port (233). Readers will note that the exemplary link table illustrated in FIG. 2 and described above is for explanation only and not for limitation. Readers will further note that when combined with the switch port-node mapping (214) that specifies the nodes connected to each switch port, the link table (206) and the switch port-node mapping (214) fully specify the nodes and the links through which those nodes are connected.

Also stored in RAM (168) is an operating system (154). Operating systems useful in blade management modules according to embodiments of the present invention may include lightweight versions of UNIX™, Linux™, Microsoft XP™, Microsoft Vista™, AIX™, IBM's i5/OS™, and others as will occur to those of skill in the art. Operating system (154), topology optimization module (150), link table (206), and switch port-node mapping (214) in the example of FIG. 2 are shown in RAM (168), but many components of such software typically are stored in non-volatile memory (172) also for example, Electrically Erasable Programmable Read-Only Memory ('EEPROM').

The exemplary topology optimization ASIC (152) of FIG. 2 includes a bus adapter (158), a computer hardware component that contains drive electronics for the high speed buses, the front side bus (162) and the memory bus (166), as well as drive electronics for the slower expansion bus (160). Through the expansion bus (160), the communications adapter (167), non-volatile memory (172), and I/O adapter (178) are connected to the other components of the ASIC (152).

The exemplary topology optimization ASIC (152) of FIG. 2 includes one or more input/output ('I/O') adapters (178). I/O adapters (178) provide components that allow the ASIC to detect network packets transmitted through the links between each pair of nodes in the physical data communications topology (200). Through the I/O adapters (178), the topology optimization ASIC (152) may capture copies of the network packets as the packets are transmitted from the switch ports (230-235) of the switch (130) to the nodes (220-225) and vice versa through the physical data connections (204). Because a network packet must traverse at least two physical data connections (204) when transferred from one node to another, the same packet may be detected by the topology optimization ASIC (152) more than once. In detecting network packets transmitted through the links between each pair of nodes in the physical data communications topology (200) in the example of FIG. 2, therefore, the topology optimization ASIC (152) may filter out duplicate network packets.

The exemplary topology optimization ASIC (152) of FIG. 2 includes a communications adapter (167) for data communications with a management module (140) and switch (130). The exemplary topology optimization ASIC (152) may communication with the management module (140) and the switch (130) according to any number of data communications protocols as will occur to those of skill in the art such as, for example, the PC bus protocol, the SMBus protocol, the IPMB protocol, and so on.

Figure 3:
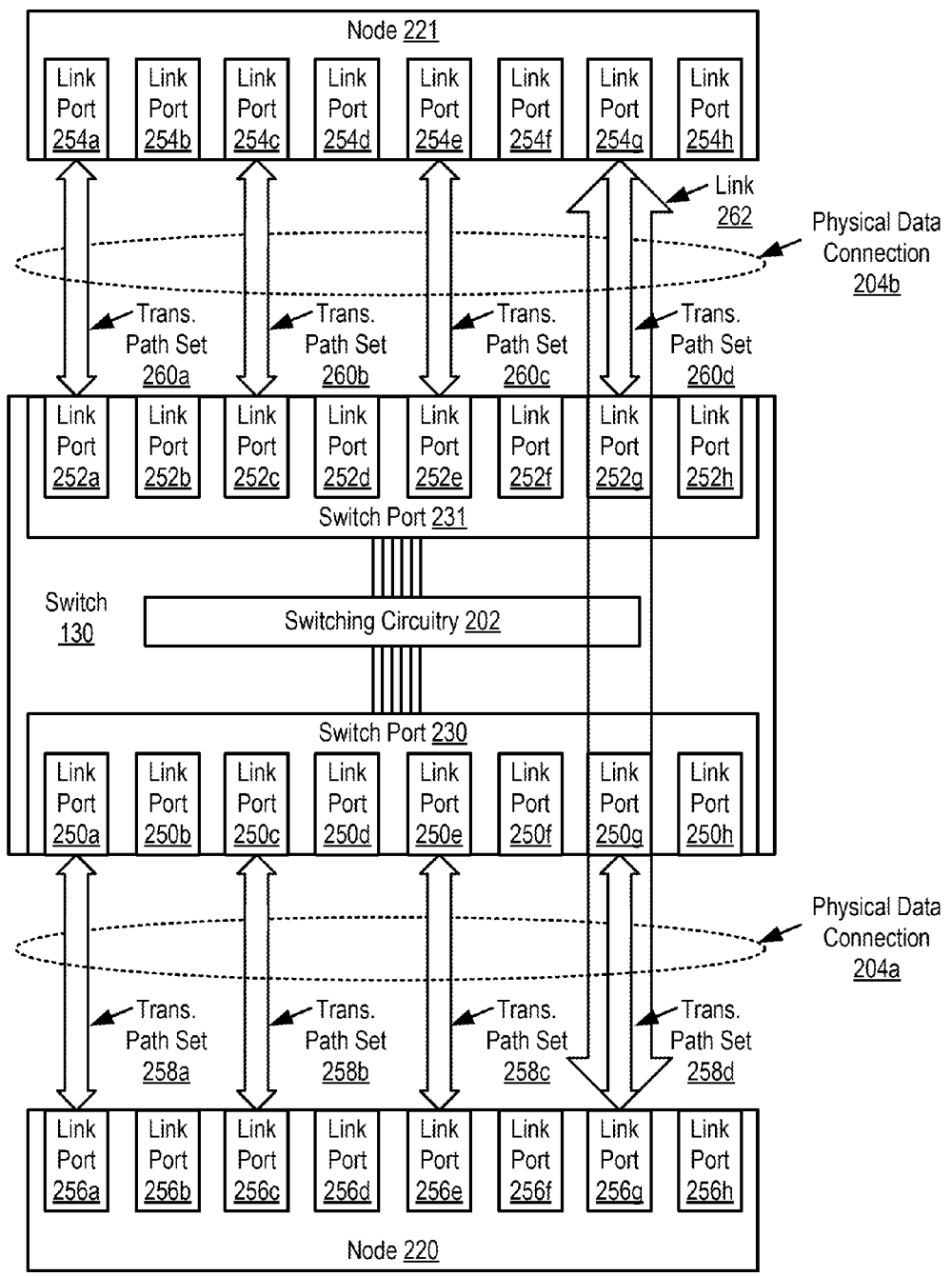
FIG. 3 sets forth a block diagram of an exemplary link between two computing nodes connected using a physical data communications topology capable of being optimized according to embodiments of the present invention.

For further explanation of the physical links between nodes illustrated in FIG. 2 and described above, FIG. 3 sets forth a block diagram of an exemplary link (262) between two computing nodes connected using a physical data communications topology capable of being optimized according to embodiments of the present invention. In the example of FIG. 3, the exemplary link (262) is formed from a connection between node (220) and a network switch (130) and a connection between the network switch (130) and node (221). The switch (130) of FIG. 3 includes a switch port for each node connected to the network switch (130). Accordingly, node (220) connects to the switch (130) through a physical data connection (204a) with a switch port (230), and node (221) connects to the switch (130) through a physical data connection (204b) with a switch port (231). The switch ports (230 and 231) are connected together within the switch (130) through switching circuitry (202).

Each physical data connection (204) of FIG. 3 between nodes (220 and 221) and switch (130) is composed of one or more sets of transmission paths. In the example of FIG. 3, the physical data connection (204a) between node (220) and switch (130) is composed of four sets (258) of transmission paths, and the physical data connection (204b) between node (221) and switch (130) is composed of four sets (260) of transmission paths. Each set of transmission paths may be implemented using differential signaling lines, terminated signaling lines, or any other implementations as will occur to those of skill in the art.

In the example of FIG. 3, each set of transmission paths connects a node with a switch port through a pair of link ports. Node (220) of FIG. 3 includes eight link ports (256), and the switch port (230) includes eight link ports (250) that correspond to the link ports (256) of node (220). Similarly, node (221) of FIG. 3 includes eight link ports (254), and the switch port (231) includes eight link ports (252) that correspond to the link ports (254) of node (221). Having multiple link port pairs between a node and a switch port provides the ability to scale the number of links in connection between two nodes. Consider, for example, FIG. 3 in which four links exist between node (220) and node (221). The first link is illustrated as link (262) in the example of FIG. 3 and is composed of a connection between link ports (254g and 252g) through the set (260d) of transmission paths, a connection between link ports (252g and 250g) through the switching circuitry (202), and a connection between link ports (250g and 256g) through the set (258d) of transmission paths. The second link (not shown) is composed of a connection between link ports (254e and 252e) through the set (260c) of transmission paths, a connection between link ports (252e and 250e) through the switching circuitry (202), and a connection between link ports (250e and 256e) through the set (258c) of transmission paths. The third link (not shown) is composed of a connection between link ports (254c and 252c) through the set (260b) of transmission paths, a connection between link ports (252c and 250c) through the switching circuitry (202), and a connection between link ports (250c and 256c) through the set (258b) of transmission paths. The fourth link (not shown) is composed of a connection between link ports (254a and 252a) through the set (260a) of transmission paths, a connection between link ports (252a and 250a) through the switching circuitry (202), and a connection between link ports (250a and 256a) through the set (258a) of transmission paths. Although only four link port pairs are utilized to form the links described above, four additional, unused link port pairs exist between each node (220 and 221) and the node's respective switch port (230 and 231). These four additional used link port pairs may be used to configure four additional links between node (220) and node (221) according to embodiments of the present invention.

Figure 4A:
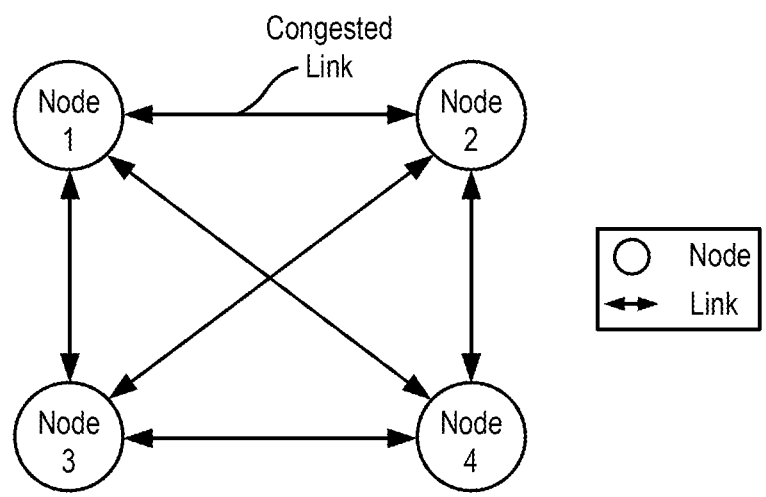
FIG. 4A sets forth a line drawing of a logical view of a physical data communications topology between a plurality of computing nodes for optimization according to embodiments of the present invention.

For further explanation of optimizing the links between nodes according to embodiments of the present invention, FIG. 4A sets forth a line drawing of a logical view of a physical data communications topology between a plurality of computing nodes for optimization according to embodiments of the present invention. In the example of FIG. 4A, each node is connected to each other node through a single link. Readers will note that the link between Node 1 and Node 2 in FIG. 4A is congested with network traffic. Such link congestion is typically due to heavy volumes of network traffic transferred between Node 1 and Node 2. The data communications topology illustrated in FIG. 4A may benefit from optimization according to embodiments of the present invention.

Figure 4B:
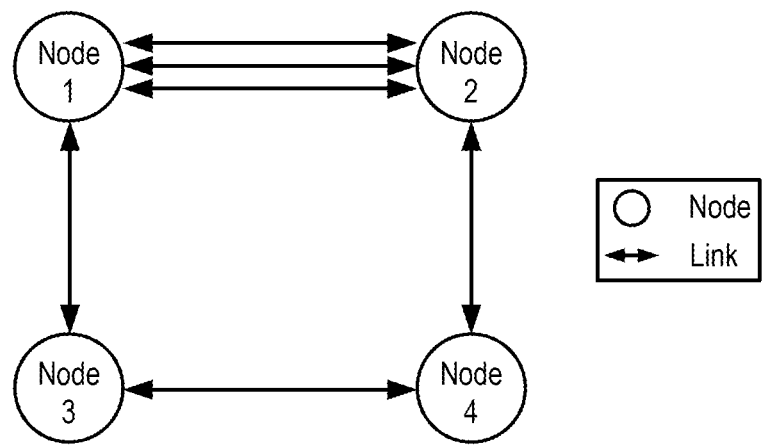
FIG. 4B sets forth a line drawing of a logical view of a physical data communications topology between a plurality of computing nodes optimized according to embodiments of the present invention.

Turning now to FIG. 4B, FIG. 4B sets forth a line drawing of a logical view of a physical data communications topology between a plurality of computing nodes illustrated in FIG. 4A that is optimized according to embodiments of the present invention. The physical data communications topology between a plurality of computing nodes is optimized according to embodiments of the present invention by reconfiguring the links between the nodes. In FIG. 4B, additional links are configured between Node 1 and Node 2 to reduce the congestion on the link already established between these nodes. Because the links supported by nodes are typically limited by the number of link ports on a node, the link between Node 1 and Node 4 is removed and the link between Node 2 and Node 3 is removed to allow for the additional links between Node 1 and Node 2.

Figure 5:
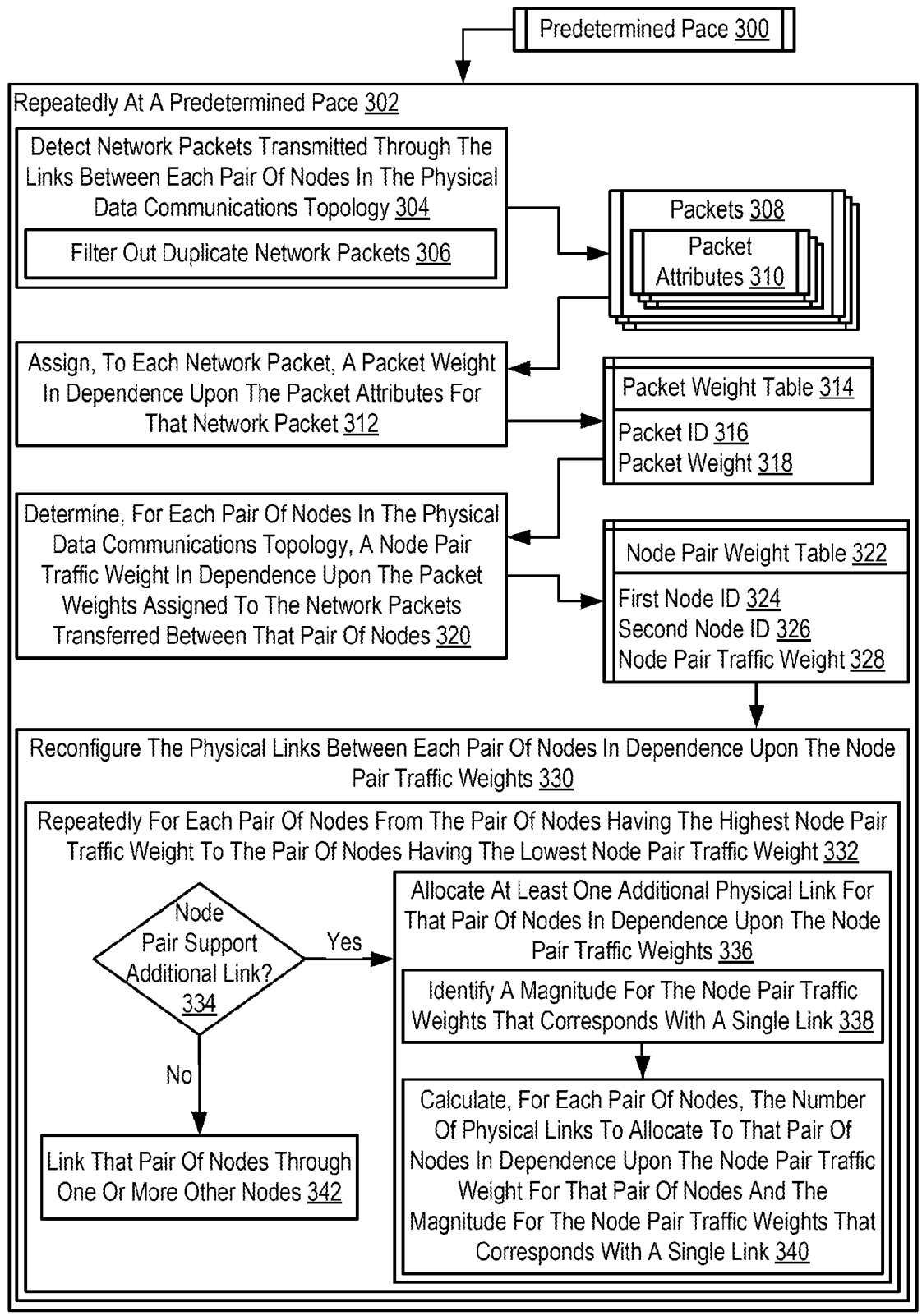
FIG. 5 sets forth a flow chart illustrating an exemplary method for optimizing a physical data communications topology between a plurality of computing nodes according to embodiments of the present invention.

For further explanation, FIG. 5 sets forth a flow chart illustrating an exemplary method for optimizing a physical data communications topology between a plurality of computing nodes according to embodiments of the present invention. The physical data communications topology described with reference to FIG. 5 includes physical links configured to connect the plurality of nodes for data communications. The method of FIG. 5 for optimizing a physical data communications topology between a plurality of computing nodes according to embodiments of the present invention is carried out repeatedly (302) at a predetermined pace (300). The predetermined pace (300) of FIG. 5 may be a static value set by a system designer or a value that changes dynamically as discussed in more detail below with reference to FIG. 7.

The method of FIG. 5 includes detecting (304) network packets (308) transmitted through the links between each pair of nodes in the physical data communications topology. Detecting (304) network packets (308) transmitted through the links between each pair of nodes in the physical data communications topology according to the method of FIG. 5 may be carried out by receiving copies of the network packets as the network packets are transmitted through the links. Such network packet copies may be provided by circuitry connected to signal lines used to implement the link between the switch and the computing node. In other embodiments, however, the network packet copies may be provided by circuit in the network switch that copies each packet as the packets are received from or transmitted to a node.

Each network packet (308) of FIG. 5 is characterized by one or more packet attributes (310). Packet attributes (310) describe characteristics of a network packet. Packet attributes (310) may include, for example, the source and destination of a packet, packet size, packet type, packet sequence number, and so on.

Detecting (304) network packets (308) transmitted through the links between each pair of nodes in the physical data communications topology according to the method of FIG. 5 includes filtering (306) out duplicate network packets. Duplicate network packets may be detected when a packet passes through an intermediary node while being transferred from a source node to a target node. Because the network packet passes through an intermediary node, the network packet is transferred along two links—one link connecting the source node and the intermediary node and another link connecting the intermediary node with the target node. Accordingly, the same packet may be detected twice and should be filtered during detection to avoid skewing the optimization of the physical data communications topology. Filtering (306) out duplicate network packets according to the method of FIG. 5 may be carried out by comparing information stored in the headers of the packets and discarding all but one of the packets whose packet header information is the same.

The method of FIG. 5 includes assigning (312), to each network packet (308), a packet weight in dependence upon the packet attributes (310) for that network packet (308). A packet weight is a weighted representation of the packet attributes for a network packet. Any number of attributes for a packet may used to generate a packet weight for that packet. Assigning (312), to each network packet (308), a packet weight according to the method of FIG. 5 may be carried out by multiplying a value for each packet attribute by a pre-defined weight value that corresponds to that particular packet attribute and storing the sum of the multiplications in a packet weight table (314). Each record in the packet weight table (314) of FIG. 5 includes a packet identifier field (316) that stores an identifier for a network packet and a packet weight field (318) for storing the packet weight of the associated network packet. For further explanation, consider that '0' for a packet's type indicates that the packet is a data packet and that '1' for a packet's type indicates that it is a control packet. Further consider, a network packet has a packet type of '0' and has a packet size of 256 bytes. For purposes of calculating a packet weight, assume that a weight of 500 corresponds to a packet's type and that a weight of 1 corresponds to a packet's size. The packet weight for such an exemplary packet may be calculated according to the following formula:

$$W_P = A_0 * W_0 + A_1 * W_1$$
$$= 0 * 500 + 256 * 1$$
$$= 256$$

where $W_P$ is packet weight, $A_0$ is a value for the packet type attribute, $W_0$ is the weight for the packet type attribute, $A_1$ is a value for the packet size attribute, and $W_1$ is the weight for the packet size attribute. The packet weight for such an exemplary packet is calculated as 256. Readers will note that had the packet been a control packet as opposed to a data packet, the packet weighting would have been higher in this example. Readers will further note that the formula and description above for assigning packet weights to packets based on packet attributes is for explanation only and not for limitation. Other ways of assigning packets weights as will occur to those of skill in the art may also be useful according to embodiments of the present invention.

The method of FIG. 5 also includes determining (320), for each pair of nodes in the physical data communications topology, a node pair traffic weight in dependence upon the packet weights assigned to the network packets (308) transferred between that pair of nodes. The node pair traffic weight for a pair of node describes the network traffic transferred between that pair of nodes in the physical data communications topology. Determining (320), for each pair of nodes in the physical data communications topology, a node pair traffic weight according to the method of FIG. 5 may be carried out by identifying every pair of nodes in the physical data communications topology, calculating the sum of all of the packet weights in the packet weight table (314) for packets being transferred between each identified node pair, and storing the sum in a node pair weight table (322) in association with the pair of nodes. Each record in the node pair weight table (322) of FIG. 5 includes a first node identifier field (324) and a second node identifier field (326) for storing the identifiers for a particular node pair. Each record in the node pair weight table (322) also includes a node pair traffic weight field (328) for storing the calculated node pair traffic weight for the associated node pair. Readers will note that the node pairs described above may be identified using a port-node mapping that lists all of the nodes in a particular physical data communications topology such as, for example, the port-node mapping illustrated in FIG. 2.

The method of FIG. 5 includes reconfiguring (330) the physical links between each pair of nodes in dependence upon the node pair traffic weights. Reconfiguring (330) the physical links between each pair of nodes in dependence upon the node pair traffic weights according to the method of FIG. 5 includes repeatedly (332) for each pair of nodes from the pair of nodes having the highest node pair traffic weight to the pair of nodes having the lowest node pair traffic weight: determining (334) whether that pair of nodes can support an additional physical link; allocating (336) at least one additional physical link for that pair of nodes in dependence upon the node pair traffic weights if that pair of nodes can support an additional physical link; and linking (342) that pair of nodes through one or more intermediary nodes if that pair of nodes cannot support an additional physical link. Configuring links for each pair of nodes from the pair of nodes having the highest node pair traffic weight to the pair of nodes having the lowest node pair traffic weight allows the node pairs having higher node pair traffic weights to receive link configuration priority over those node pairs having lower node pair traffic weights.

Determining (334) whether each pair of nodes can support an additional physical link according to the method of FIG. 5 may be carried out by identifying whether each node in a particular node pair and each switch port to which these nodes connect has at least one available link port that can be used to establish an additional link between that pair of node. If each node in a particular node pair and each switch port to which these nodes connect has at least one available link port that can be used to establish an additional link between that pair of node, then that pair of nodes can support an additional physical link. If each node in a particular node pair and each switch port to which these nodes connect does not have at least one available link port that can be used to establish an additional link between that pair of node, then that pair of nodes cannot support an additional physical link. When the process of optimizing physical data communications topology first begins, readers will note that each pair of nodes can typically support an additional link because no links have been configured between the nodes. As the optimization continues repeatedly for each pair of nodes and more and more node pairs are configured with links, however, the number of available link ports on more and more nodes will decrease.

Allocating (336) at least one additional physical link for that pair of nodes in dependence upon the node pair traffic weights according to the method of FIG. 5 includes identifying (338) a saturation magnitude for the node pair traffic weights that corresponds with a single link and calculating (340), for each pair of nodes, the number of physical links to allocate to that pair of nodes in dependence upon the node pair traffic weight for that pair of nodes and the saturation magnitude for the node pair traffic weights that corresponds with a single link. The saturation magnitude is a maximum value for a node pair traffic weight that indicates the network traffic between two nodes warrants a single link. That is, the saturation magnitude indicates the level of network traffic for a single link such that any additional traffic would decrease the overall throughput of the link and reduce link efficiency. Values for the node pair traffic weight above the saturation magnitude indicate that the network traffic between two nodes warrants one or more direct links. Identifying (338) a saturation magnitude for the node pair traffic weights that corresponds with a single link according to the method of FIG. 5 may be carried out by retrieving the saturation magnitude from a network topology configuration repository.

Calculating (340), for each pair of nodes, the number of physical links to allocate to that pair of nodes in dependence upon the node pair traffic weight for that pair of nodes and the saturation magnitude for the node pair traffic weights that corresponds with a single link according to the method of FIG. 5 may be carried out by dividing the node pair traffic weight for that pair of nodes by the saturation magnitude, rounding the quotient resulting from the division to the nearest integer, and assigning the rounded quotient as the number of physical links. Consider, for example, a pair of nodes having a node pair traffic weight of 500 and that the saturation magnitude for node pair traffic weights is 150. The number of physical links to allocate to this exemplary pair of nodes may be calculated as follows:

$$N_L = R(W_{N-P} \div S)$$
$$= R(500 \div 150)$$
$$= R(3.333)$$
$$= 3$$

where $N_L$ is number of links to allocate to a pair of node, $W_{N-P}$ is the node pair traffic weight for the pair of nodes, S is the saturation magnitude for node pair traffic weights that corresponds with a single link, and the function R( ) returns the integer closest to the input parameter. As indicated above, the number of physical links to allocate to a node pair having a node pair traffic weight of 500 is 3 physical links. Readers will note that the formula and description above for calculating the number of physical links to allocate to a pair of nodes is for explanation only and not for limitation. Other ways of calculating the number of physical links to allocate to a pair of nodes as will occur to those of skill in the art may also be useful according to embodiments of the present invention.

As mentioned above, the method of FIG. 5 also includes linking (342) a pair of nodes through one or more intermediary nodes if that pair of nodes cannot support an additional physical link. An intermediary node is a node in the physical data communications topology through which the two nodes in the node pair are connected. When linking (342) a pair of nodes through one or more intermediary nodes, using less intermediary nodes to connect the pair of nodes typically results in the more efficient communications between the node pair and in the overall network topology. Accordingly, readers will note the advantages in selecting a node that is adjacent to each node in the pair as an intermediary node when that adjacent node already has a link with each node in the node pair. If due to practical considerations such as, for example, the nodes in the pair and the adjacent nodes lack the needed number of link ports to establish the proper connections between the nodes, more than one node may be chained together to provide a communications path between both of the nodes in the pair. Regardless of the number of intermediary nodes used to provide a communications path between the node pair, however, readers will note that the number of links connecting all of the intermediary nodes and the nodes in the nodes pair should provide sufficient bandwidth to handle the network traffic between the nodes in the node pair. The number of links between each node used to connect the nodes in the node pair together may be calculated according to the node pair traffic weight as described above.

In description above with reference to FIG. 5, allocating an additional physical link for a pair of nodes is carried out using a saturation magnitude that indicates the level of network traffic for a single link such that any additional traffic would decrease the overall throughput of the link and reduce link efficiency. In other embodiments, however, allocating an additional physical link for a pair of nodes may be carried out based on the maximum number of links for each pair of nodes. For further explanation, consider FIG. 6 that sets forth a flow chart illustrating a further exemplary method for optimizing a physical data communications topology between a plurality of computing nodes according to embodiments of the present invention. The physical data communications topology described with reference to FIG. 6 includes physical links configured to connect the plurality of nodes for data communications. The method of FIG. 6 for optimizing a physical data communications topology between a plurality of computing nodes according to embodiments of the present invention is carried out repeatedly (302) at a predetermined pace (300).

Figure 6:
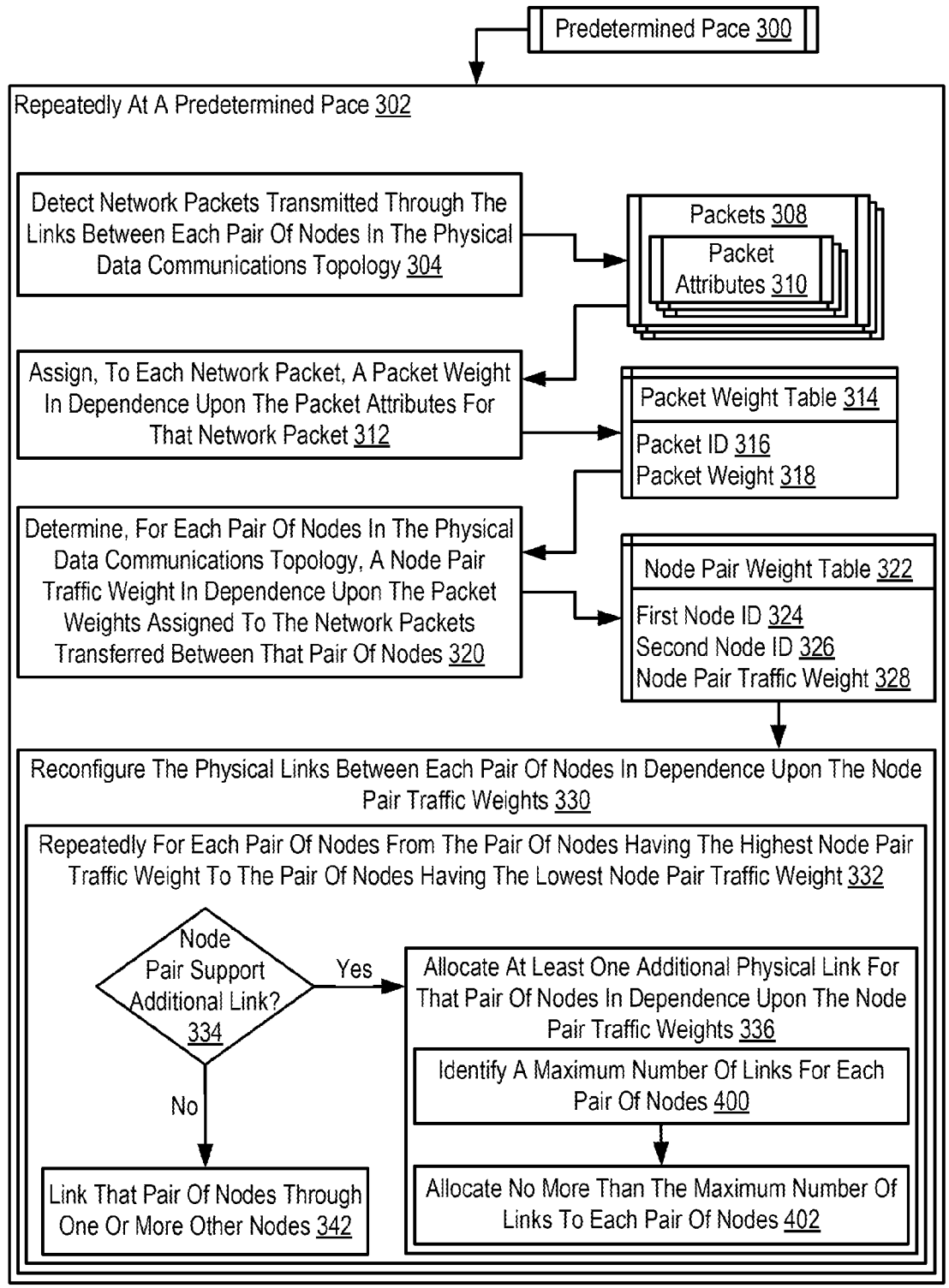
FIG. 6 sets forth a flow chart illustrating a further exemplary method for optimizing a physical data communications topology between a plurality of computing nodes according to embodiments of the present invention.

The method of FIG. 6 is similar to the method of FIG. 5. That is, the method of FIG. 6 includes: detecting (304) network packets (308) transmitted through the links between each pair of nodes in the physical data communications topology, each network packet (308) characterized by one or more packet attributes (310); assigning (312), to each network packet (308), a packet weight in dependence upon the packet attributes (310) for that network packet (308); determining (320), for each pair of nodes in the physical data communications topology, a node pair traffic weight in dependence upon the packet weights assigned to the network packets (308) transferred between that pair of nodes; and reconfiguring (330) the physical links between each pair of nodes in dependence upon the node pair traffic weights. The packets weights are assigned using a packet weight table (314), each record of which includes a packet identifier field (316) and a packet weight field (318). The node pair traffic weights are stored in a node pair weight table (322), each record of which includes a first node identifier field (324), a second node identifier field (326), and a node pair traffic weight field (328). In addition, the method of FIG. 6 is also similar to the method of FIG. 5 in that reconfiguring (330) the physical links between each pair of nodes in dependence upon the node pair traffic weights includes repeatedly (332) for each pair of nodes from the pair of nodes having the highest node pair traffic weight to the pair of nodes having the lowest node pair traffic weight: determining (334) whether that pair of nodes can support an additional physical link; allocating (336) at least one additional physical link for that pair of nodes in dependence upon the node pair traffic weights if that pair of nodes can support an additional physical link; and linking (342) that pair of nodes through one or more intermediary nodes if that pair of nodes cannot support an additional physical link.

In the method of FIG. 6, allocating (336) at least one additional physical link for that pair of nodes in dependence upon the node pair traffic weights includes identifying (400) a maximum number of links for each pair of nodes and allocating (402) no more than the maximum number of links to each pair of nodes, starting with the node having the highest node pair traffic weight and proceeding down to the node having the lowest node pair traffic weight. Identifying (400) a maximum number of links for each pair of nodes according to the method of FIG. 6 may be carried out by identifying the maximum number of available link ports for each node in the node pair and selecting the lowest number of available link ports between the nodes as the maximum number of links. Readers will note that the maximum number of available link ports for each node may be obtained from a port-node mapping that lists all of the nodes in a particular physical data communications topology such as, for example, the port-node mapping illustrated in FIG. 2.

As mentioned above, the predetermined pace at which exemplary methods for optimize a physical data communications topology between a plurality of computing nodes according to embodiments of the present invention may change dynamically. For further explanation, therefore, consider FIG. 7 that sets forth a flow chart illustrating a further exemplary method for optimizing a physical data communications topology between a plurality of computing nodes according to embodiments of the present invention. The physical data communications topology described with reference to FIG. 7 includes physical links configured to connect the plurality of nodes for data communications. The method of FIG. 7 for optimizing a physical data communications topology between a plurality of computing nodes according to embodiments of the present invention is carried out repeatedly (302) at a predetermined pace (300).

Figure 7:
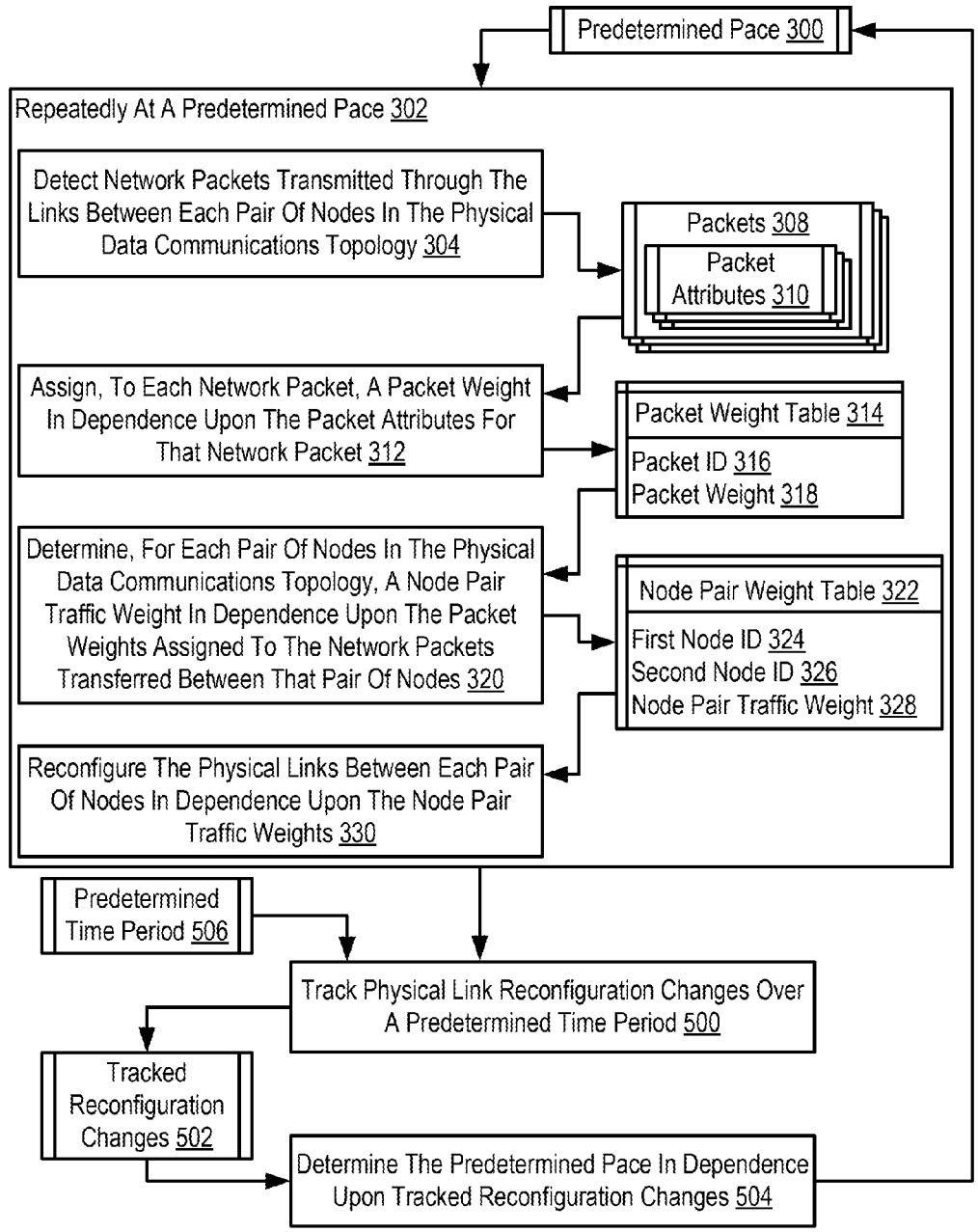
FIG. 7 sets forth a flow chart illustrating a further exemplary method for optimizing a physical data communications topology between a plurality of computing nodes according to embodiments of the present invention.

The method of FIG. 7 is similar to the methods of FIGS. 5 and 6. That is, the method of FIG. 7 includes: detecting (304) network packets (308) transmitted through the links between each pair of nodes in the physical data communications topology, each network packet (308) characterized by one or more packet attributes (310); assigning (312), to each network packet (308), a packet weight in dependence upon the packet attributes (310) for that network packet (308); determining (320), for each pair of nodes in the physical data communications topology, a node pair traffic weight in dependence upon the packet weights assigned to the network packets (308) transferred between that pair of nodes; and reconfiguring (330) the physical links between each pair of nodes in dependence upon the node pair traffic weights. The packets weights are assigned using a packet weight table (314), each record of which includes a packet identifier field (316) and a packet weight field (318). The node pair traffic weights are stored in a node pair weight table (322), each record of which includes a first node identifier field (324), a second node identifier field (326), and a node pair traffic weight field (328).

The method of FIG. 7 also includes tracking (500) physical link reconfiguration changes (502) over a predetermined time period (506) and determining (504) the predetermined pace (300) in dependence upon tracked reconfiguration changes (502).

The physical link reconfiguration changes (502) represent how the physical links in the physical data communications topology are reconfigured from one iteration of optimizing a physical data communications topology between a plurality of computing nodes according to embodiments of the present invention to another. The physical link reconfiguration changes (502) may be implemented in any number of ways as will occur to those of skill in the art such as, for example, the number of links configured differently in the current iteration when compared to the previous iteration. The predetermined time period (506) may be implemented as a particular number of second or as a particular number of iterations over which the physical link reconfiguration changes (502) are tracked. The predetermined time period (506) may be set as a static value or may be altered periodically by a system administrator or by some software algorithm.

Determining (504) the predetermined pace (300) according to the method of FIG. 7 may be carried out by comparing the physical link reconfiguration changes (502) to a predefined upper threshold and a predefined lower threshold. Such a predefined upper threshold may specify a level of link reconfiguration activity at which optimization of the topology should occur more frequently. Such a predefined lower threshold may specify a level of link reconfiguration activity at which optimization of the topology should occur less frequently. Determining (504) the predetermined pace (300) according to the method of FIG. 7 may further be carried out by setting the predetermined pace (300) to a lower value to slow the pace of optimization if the physical link reconfiguration changes (502) are below the lower threshold, and setting the predetermined pace (300) to a higher value to increase the pace of optimization if the physical link reconfiguration changes (502) are above the upper threshold.

Exemplary embodiments of the present invention are described largely in the context of a fully functional blade center configure for optimizing a physical data communications topology between a plurality of computing nodes. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of optimizing a physical data communications topology between a plurality of computing nodes, the physical data communications topology including physical links configured to connect the plurality of nodes for data communications, the method carried out repeatedly at a predetermined pace and comprising:
   physically reconfiguring the physical links between each pair of nodes in dependence upon node pair traffic weights, wherein:
   the node pair traffic weights are determined in dependence upon packet weights assigned to network packets transferred between the pair of nodes and;
   physically reconfiguring the physical links between each pair of nodes in dependence upon the node pair traffic weights further comprises:
   repeatedly for each pair of nodes from the pair of nodes having the highest node pair traffic weight to the pair of nodes having the lowest node pair traffic weight:
   determining whether that pair of nodes can support an additional physical link;
   allocating at least one additional physical link for that pair of nodes in dependence upon the node pair traffic weights if that pair of nodes can support an additional physical link; and
   linking that pair of nodes through one or more intermediary nodes if that pair of nodes cannot support an additional physical link.

2. The method of claim 1 further comprising:
   detecting network packets transmitted through the links between each pair of nodes in the physical data communications topology, each network packet characterized by one or more packet attributes including detecting network packets transmitted through the links between each pair of nodes in the physical data communications topology further comprises filtering out duplicate network packets.

3. The method of claim 1 wherein allocating at least one additional physical link for that pair of nodes in dependence upon the node pair traffic weights if that pair of nodes can support an additional physical link further comprises:
   identifying a saturation magnitude for the node pair traffic weights that corresponds with a single link; and
   calculating, for each pair of nodes, the number of physical links to allocate to that pair of nodes in dependence upon the node pair traffic weight for that pair of nodes and the saturation magnitude for the node pair traffic weights that corresponds with a single link.

4. The method of claim 1 wherein allocating at least one additional physical link for that pair of nodes in dependence upon the node pair traffic weights if that pair of nodes can support an additional physical link further comprises:
   identifying a maximum number of links for each pair of nodes; and
   allocating no more than the maximum number of links to each pair of nodes.

5. The method of claim 1 further comprising:
   tracking physical link reconfiguration changes over a predetermined time period; and
   determining the predetermined pace in dependence upon tracked reconfiguration changes.

6. Apparatus for optimizing a physical data communications topology between a plurality of computing nodes, the physical data communications topology including physical links configured to connect the plurality of nodes for data communications, the apparatus comprising a computer processor, a computer memory operatively coupled to the computer processor, the computer memory having disposed within it computer program instructions capable of carrying out repeatedly at a predetermined pace:
   physically reconfiguring the physical links between each pair of nodes in dependence upon node pair traffic weights, wherein:
   the node pair traffic weights are determined in dependence upon packet weights assigned to network packets transferred between the pair of nodes and;
   physically reconfiguring the physical links between each pair of nodes in dependence upon the node pair traffic weights further comprises:
   repeatedly for each pair of nodes from the pair of nodes having the highest node pair traffic weight to the pair of nodes having the lowest node pair traffic weight:
   determining whether that pair of nodes can support an additional physical link;
   allocating at least one additional physical link for that pair of nodes in dependence upon the node pair traffic weights if that pair of nodes can support an additional physical link; and
   linking that pair of nodes through one or more intermediary nodes if that pair of nodes cannot support an additional physical link.

7. The apparatus of claim 6 further comprising computer program instructions capable of:
   detecting network packets transmitted through the links between each pair of nodes in the physical data communications topology, each network packet characterized by one or more packet attributes including detecting network packets transmitted through the links between each pair of nodes in the physical data communications topology further comprises filtering out duplicate network packets.

8. The apparatus of claim 6 wherein allocating at least one additional physical link for that pair of nodes in dependence upon the node pair traffic weights if that pair of nodes can support an additional physical link further comprises:
   identifying a saturation magnitude for the node pair traffic weights that corresponds with a single link; and
   calculating, for each pair of nodes, the number of physical links to allocate to that pair of nodes in dependence upon the node pair traffic weight for that pair of nodes and the saturation magnitude for the node pair traffic weights that corresponds with a single link.

9. The apparatus of claim 6 wherein allocating at least one additional physical link for that pair of nodes in dependence upon the node pair traffic weights if that pair of nodes can support an additional physical link further comprises:
   identifying a maximum number of links for each pair of nodes; and
   allocating no more than the maximum number of links to each pair of nodes.

10. The apparatus of claim 6 wherein the computer memory has disposed within it computer program instructions capable of:
    tracking physical link reconfiguration changes over a predetermined time period; and
    determining the predetermined pace in dependence upon tracked reconfiguration changes.

11. A computer program product for optimizing a physical data communications topology between a plurality of computing nodes, the physical data communications topology including physical links configured to connect the plurality of nodes for data communications, the computer program product disposed upon a non-transitory computer readable storage medium, the computer program product comprising computer program instructions capable of carrying out repeatedly at a predetermined pace:
    physically reconfiguring the physical links between each pair of nodes in dependence upon node pair traffic weights, wherein:

the node pair traffic weights are determined in dependence upon packet weights assigned to network packets transferred between the pair of nodes and;

physically reconfiguring the physical links between each pair of nodes in dependence upon the node pair traffic weights further comprises:

repeatedly for each pair of nodes from the pair of nodes having the highest node pair traffic weight to the pair of nodes having the lowest node pair traffic weight:

determining whether that pair of nodes can support an additional physical link;

allocating at least one additional physical link for that pair of nodes in dependence upon the node pair traffic weights if that pair of nodes can support an additional physical link; and linking that pair of nodes through one or more intermediary nodes if that pair of nodes cannot support an additional physical link.

12. The computer program product of claim 11 further comprising computer program instructions capable of:

detecting network packets transmitted through the links between each pair of nodes in the physical data communications topology, each network packet characterized by one or more packet attributes including detecting network packets transmitted through the links between each pair of nodes in the physical data communications topology further comprises filtering out duplicate network packets.

13. The computer program product of claim 11 wherein allocating at least one additional physical link for that pair of nodes in dependence upon the node pair traffic weights if that pair of nodes can support an additional physical link further comprises:

identifying a saturation magnitude for the node pair traffic weights that corresponds with a single link; and calculating, for each pair of nodes, the number of physical links to allocate to that pair of nodes in dependence upon the node pair traffic weight for that pair of nodes and the saturation magnitude for the node pair traffic weights that corresponds with a single link.

14. The computer program product of claim 11 wherein allocating at least one additional physical link for that pair of nodes in dependence upon the node pair traffic weights if that pair of nodes can support an additional physical link further comprises:

identifying a maximum number of links for each pair of nodes; and allocating no more than the maximum number of links to each pair of nodes.

15. The computer program product of claim 11 further comprising computer program instructions capable of:

tracking physical link reconfiguration changes over a predetermined time period; and determining the predetermined pace in dependence upon tracked reconfiguration changes.

* * * * *